(12) United States Patent
Chen et al.

(10) Patent No.: US 11,303,801 B2
(45) Date of Patent: *Apr. 12, 2022

(54) DETERMINING SETTINGS OF A CAMERA APPARATUS

(71) Applicant: Kyndryl, Inc., New York, NY (US)

(72) Inventors: Dong Chen, Beijing (CN); Ling Chen, Beijing (CN); Yuan-Shyang Lee, Taipei (CN); Tao Liu, Beijing (CN); Jie Peng, Beijing (CN); Yu Lin Zhai, Beijing (CN)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,672

(22) Filed: Jan. 31, 2020

(65) Prior Publication Data

US 2020/0169661 A1 May 28, 2020

Related U.S. Application Data

(63) Continuation of application No. 15/906,551, filed on Feb. 27, 2018, now Pat. No. 10,609,277, which is a
(Continued)

(51) Int. Cl.
*H04N 5/232* (2006.01)
*G06F 16/54* (2019.01)

(52) U.S. Cl.
CPC ......... *H04N 5/23216* (2013.01); *G06F 16/54* (2019.01); *H04N 5/23206* (2013.01); *H04N 5/23222* (2013.01)

(58) Field of Classification Search
CPC .......... H04N 5/23222; H04N 5/23216; H04N 5/23206; G06F 17/30274; G06F 16/54
(Continued)

(56) References Cited

U.S. PATENT DOCUMENTS 6,822,756 B1 11/2004 Cok
6,965,398 B2 11/2005 Arakt
(Continued)

FOREIGN PATENT DOCUMENTS

CN 101534404 A 9/2009
CN 102334330 A 1/2012

OTHER PUBLICATIONS

P. Mell, et al., "The NIST Definition of Cloud Computing", NIST Special Publication 800-145, Sep. 2011, Gaithersburg, MD, 7 pages.
(Continued)

*Primary Examiner* — Marly S Camargo
(74) *Attorney, Agent, or Firm* — Ken Han; George S. Blasiak; Heslin Rothenberg Farley & Mesiti PC

(57) ABSTRACT

Methods and computer program products for determining one or more settings of a camera apparatus are provided. The methods include obtaining one or more parameters of the camera apparatus and determining one or more settings of the camera apparatus using the one or more parameters and an image repository. The image repository may include images with image parameters associated with the images, which may be correlated with the one or more parameters of the camera apparatus, and the images may also have an associated rating attribute. One or more images may be identified for inclusion in a subset of images, based on an image's image parameters and/or based on an image's rating attribute. The camera settings of one image of the subset of images, corresponding to the settings used to create the one image, may be used to automatically adjust the one or more settings of the camera apparatus.

20 Claims, 13 Drawing Sheets

Related U.S. Application Data continuation of application No. 14/826,693, filed on Aug. 14, 2015, now Pat. No. 9,986,149.

(58) Field of Classification Search
USPC ....... 725/105; 348/207.11, 222.1; 455/456.1, 455/456.2, 456.3, 456.5; 715/721, 745
See application file for complete search history.

(56) References Cited

U.S. PATENT DOCUMENTS

| | | | |
|---|---|---|---|
| 7,986,344 B1 | 7/2011 | Ishii et al. | |
| 8,332,427 B2 | 12/2012 | Whitby | |
| 9,692,693 B2 | 6/2017 | Yim et al. | |
| 9,788,029 B2* | 10/2017 | Karp | H04N 21/2743 |
| 9,798,933 B1* | 10/2017 | Meissner | H04N 7/16 |
| | | | 348/14.01 |
| 9,986,149 B2 | 5/2018 | Chen et al. | |
| 10,349,012 B2* | 7/2019 | Carey | H04N 7/181 |
| 10,360,457 B2* | 7/2019 | Meisser | H04N 7/15 |
| 11,106,032 B2* | 8/2021 | Solomon | H04N 5/217 |
| 2004/0125877 A1* | 7/2004 | Chang | H04N 7/12 |
| | | | 375/240.28 |
| 2007/0250901 A1* | 10/2007 | McIntire | H04N 7/16 |
| | | | 725/105 |
| 2008/0028298 A1 | 1/2008 | Kaneko | |
| 2008/0050039 A1 | 2/2008 | Jin | |
| 2008/0056706 A1 | 3/2008 | Battles et al. | |
| 2011/0026835 A1 | 2/2011 | Ptucha | |
| 2011/0292221 A1 | 12/2011 | Gu et al. | |
| 2013/0031218 A1* | 1/2013 | Klassen | G06F 15/16 |
| | | | 709/219 |
| 2013/0067333 A1* | 3/2013 | Brenneman | G06F 3/01 |
| | | | 715/721 |
| 2013/0235224 A1* | 9/2013 | Park | H04N 5/2622 |
| | | | 348/218.1 |
| 2013/0286244 A1 | 10/2013 | Tirpak et al. | |
| 2013/0330007 A1 | 12/2013 | Kim et al. | |
| 2014/0118479 A1 | 5/2014 | Rapoport et al. | |
| 2014/0270682 A1* | 9/2014 | Carey | H04N 7/181 |
| | | | 386/223 |
| 2015/0149454 A1 | 5/2015 | Hieronymus et al. | |
| 2015/0189171 A1 | 7/2015 | Yim et al. | |
| 2016/0134932 A1* | 5/2016 | Karp | H04N 21/443 |
| 2016/0142625 A1* | 5/2016 | Weksler | H04N 5/23222 |
| | | | 348/222.1 |
| 2018/0295276 A1 | 10/2018 | Chen et al. | |

OTHER PUBLICATIONS

List of IBM Patents or Applications Treated as Related, Jan. 31. 2020, 2 pgs.

* cited by examiner

DETERMINING SETTINGS OF A CAMERA APPARATUS

CROSS-REFERENCE TO RELATED APPLICATIONS

This application is a continuation of U.S. patent application Ser. No. 15/906,551, filed Feb. 27, 2018, entitled "Determining Settings Of A Camera Apparatus", which is incorporated by reference herein in its entirety, which is a continuation of U.S. patent application Ser. No. 14/826,693, filed Aug. 14, 2015, entitled, "Determining Settings of a Camera Apparatus," which is incorporated by reference herein in its entirety.

TECHNICAL FIELD

The present disclosure relates to determining settings of a camera apparatus, and more particularly to determining settings of a camera apparatus using parameters of the camera apparatus and an image repository.

BACKGROUND

Taking pictures with a camera has been a common activity for decades and has become even more common with the wide availability of cameras as well as mobile devices that include a camera apparatus embedded or integrated into the device. Taking professional quality images, however, remains a challenge. Professional as well as amateur photographers may find it difficult to manually determine what camera settings are best in any particular situation, not only due to variable external conditions such as lighting and weather but also due to the complex interplay of camera settings and components.

SUMMARY

Shortcomings of the prior art are overcome and additional advantages are provided through the provision, in one aspect, of a method. The method includes obtaining, at one or more processor, one or more parameters of a camera apparatus. The method further includes determining, at one or more processor, one or more settings of the camera apparatus using one or more parameters of the camera apparatus and an image repository.

In one embodiment, the image repository is external from the camera apparatus. This may, for example, provide the user of the camera apparatus with access to image repositories stored on remote servers or that are provided as services in a cloud environment.

In one embodiment, using the image repository includes using one or more images of the image repository. The one or more images have one or more image parameters associated with the one or more images. The determining further includes identifying, at the one or more processor, a correspondence between at least one image parameter and at least one parameter of the one or more parameters of the camera apparatus. This may, for example, advantageously facilitate matching images from the image repository to parameters of the camera apparatus to determine appropriate settings for the camera apparatus.

In another embodiment, the one or more images have a rating attribute. Using the one or more images may include identifying at least one image of the one or more images to be included in a subset of images, the identifying being based on the rating attribute of the at least one image and on at least one image parameter of the at least one image. This may, for example, help in selecting highly-rated images that were created with similar parameters as the camera apparatus, further facilitating determining the settings for the camera apparatus.

In another embodiment, at least one image identified to be included in the subset of images has more image parameters identified as corresponding to parameters of the one or more parameters of the camera apparatus than images of the one or more images not identified to be included in the subset of images. For example, a particular image in the image repository may have been created with several parameters in common with the camera apparatus, while other images in the repository may have few or no parameters in common with the camera apparatus. To determine the most appropriate settings for the camera apparatus, the image with several parameters in common may be chosen for determining the settings of the camera apparatus, while the other images may not be selected.

In another embodiment, the at least one image identified to be included in the subset of images has a higher rating attribute than images of the one or more images not identified to be included in the subset of images. For example, a particular image in the image repository may have a very high rating, as rated by users of the image repository, which may correspond to the image's aesthetic qualities, technical qualities, or other qualities that appeal to the users. To determine the most appropriate settings for the camera apparatus for creating an image of similar quality, the image with a very high rating may be used while other images of the repository with a lower rating may not be selected for use.

In another embodiment, the one or more images have one or more camera settings associated with the one or more images, where the camera settings of one image correspond to the camera settings that were used to create that image. Determining the one or more settings for the camera apparatus may further include selecting one image of the subset of images. The one or more settings for the camera apparatus may be automatically adjusted based on the one or more camera settings associated with the one image. This advantageously allows a user of the camera apparatus to create images with the most appropriate camera settings, based on the camera model and specifications, as well as external conditions, without having to know what the most appropriate settings are for the camera and current conditions. Camera users can create high quality images without having to be photography professionals.

In one example embodiment, selecting one image of the subset of images may be performed at the one or more processor. The one image may, for instance, have a higher rating attribute than the rating attributes of other images included in the subset of images. For example, this allows for automatic selection of the most highly rated image from the image repository to use in determining the settings of the camera apparatus, allowing the user to create high quality images quickly and without having to make manual selections.

In an alternative example embodiment, the method may include displaying the subset of images at the camera apparatus. Selecting one image of the subset of images may be performed by a user of the camera apparatus based on the display of the subset of images. For example, this allows the user of the camera apparatus to see a subset of high quality, highly rated images that were created using similar parameters as the user's camera apparatus. The user may manually select one image that he or she likes best, and that image's settings may be used to determine the settings of the camera apparatus.

In another embodiment, the one or more settings of the camera apparatus may include one or more of a focal length, a shutter speed, an exposure time, a color balance, a flash setting, a light sensitivity setting, or an aperture size. For example, the image selected for use in determining the one or more settings of the camera apparatus may have settings information regarding the shutter speed and flash settings of the camera that was used to create the image. The settings information of the image may then be used to adjust the shutter speed and flash settings of the camera apparatus to help create a similar quality image by the camera apparatus.

In another embodiment, the one or more parameters of the camera apparatus may include one or more of a camera brand, a camera model, an image resolution, a pixel size, a geographical location, a lighting condition, a weather condition, a date parameter, a time parameter, a camera orientation parameter, a focal length, a shutter speed, an exposure time, a color balance, a flash setting, a light sensitivity setting, or an aperture size. For example, it may be advantageous to select images from the image repository that were created by a similar camera brand and model as the user's camera apparatus, while images created with different cameras may not be useful for determining the best settings for the user's camera apparatus. In another example, if the camera apparatus is being used outside on a bright and clear day, then it may be advantageous to select images from the image repository that were also created outside on a bright and clear day, and to not use images created in low lighting conditions or indoors.

In yet another embodiment, the image repository may be provided as a service in a cloud environment. Providing the image repository as a cloud environment may allow access to multiple images from multiple image repositories, increasing the likelihood that high quality, highly rated images that may be used in determining one or more settings of the camera apparatus may be found.

In another aspect, a computer program product is provided. The computer program product may include a computer readable storage medium readable by one or more processing apparatus and instructions stored on the computer readable storage medium for execution by the one or more processing apparatus. The instructions may be instructions for performing a method that includes obtaining, at one or more processor, one or more parameters of a camera apparatus. The method further includes determining, at one or more processor, one or more settings of the camera apparatus using one or more parameters of the camera apparatus and an image repository.

Additional features and advantages are realized through the techniques set forth herein. Other embodiments and aspects are described in detail herein and are considered a part of the claimed disclosure.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
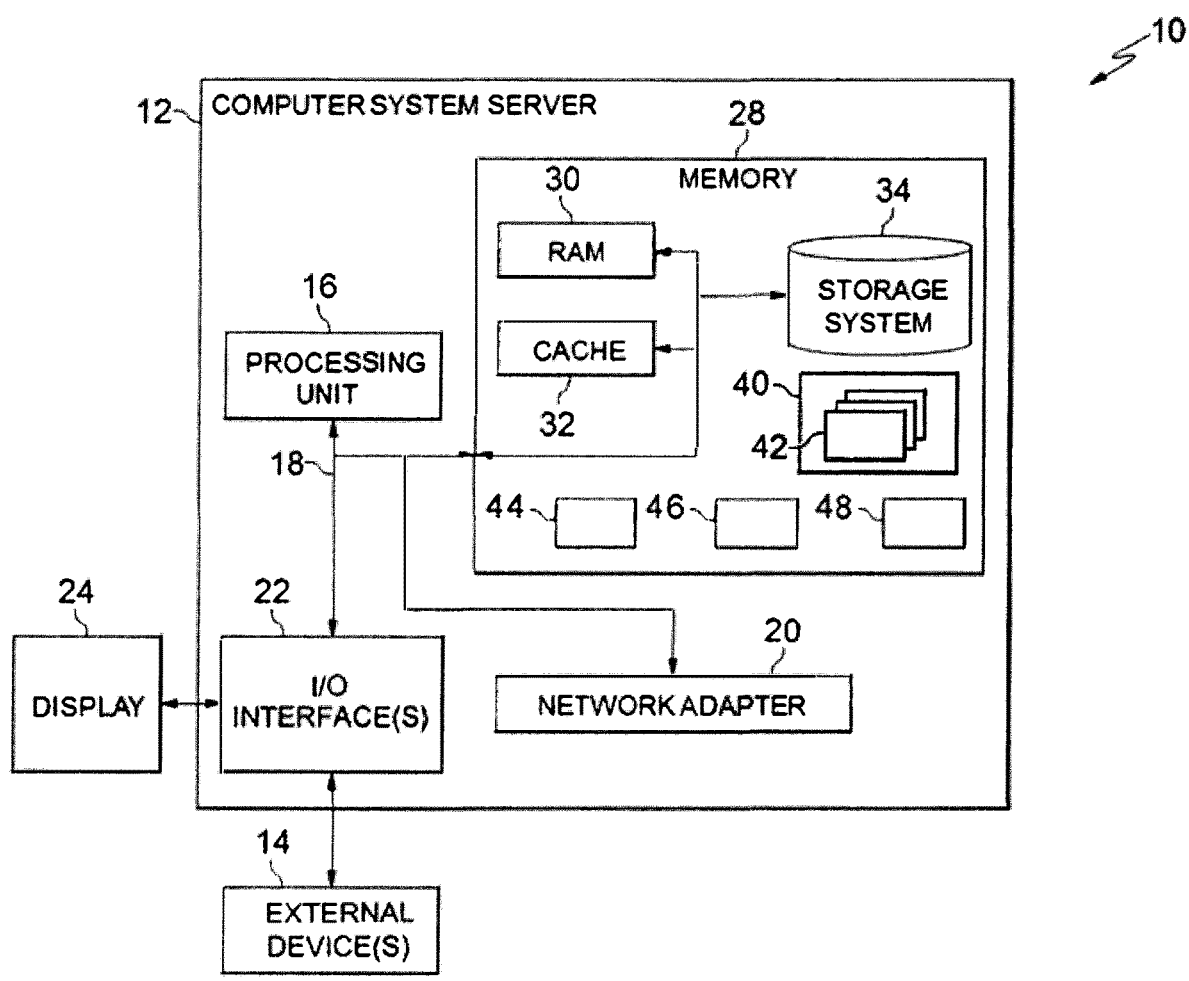
FIG. 1 depicts a cloud computing node, in accordance with one or more aspects set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects described herein, are given by way of illustration only, and not by way of limitation. Various substitutions, modifications, additions, and/or arrangements, within the spirit and/or scope of the underlying concepts will be apparent to those skilled in the art from this disclosure.

Taking pictures with a camera has become a common, given the wide availability of stand-alone cameras, ranging from simple point-and-shoot cameras to professional-level digital camera apparatuses, as well as mobile devices that include a camera apparatus embedded or integrated into the device. Taking professional quality images, however, remains a challenge. Professional as well as amateur photographers may find it difficult to manually determine what camera settings are best in any particular situation, not only due to variable external conditions such as lighting and weather but also due to the complex interplay of camera settings and components. The numerous settings that can affect the quality of an image may also make it difficult to determine what the best or most appropriate settings are for any particular photography situation.

Advantageously, the techniques presented herein provide improved techniques for determining one or more settings of a camera apparatus by using one or more parameters of the camera apparatus and an image repository. The image repository may have a library or database of images that are available to users of the repository. The images may have image parameters associated with the images, indicating, for example, the make or model of camera used to record an image, the ambient lighting conditions or weather conditions in which the image was created, and so on. Camera settings may also be associated with the images, indicating the particular settings of the camera that were used to record an image. As well, the images in the repository may have a rating attribute associated with the images, the ratings generally assigned by users of the repository, with high ratings generally corresponding to high-quality images. By selecting a highly-rated image from the repository with image parameters that correlate to the parameters of a user's camera apparatus, the camera settings of the camera apparatus can be automatically adjusted to match the camera settings that were used to create the highly-rated image, enabling the user to take similarly high-quality pictures without needing to know how to manually adjust the camera apparatus's settings for best results.

The present disclosure provides, in part, methods, computer programs, computer systems, and/or network devices that may address one or more issues described above, and that may determine, at one or more processor, one or more settings for a camera apparatus, where the determining includes using, by the one or more processor, one or more parameters of the camera apparatus and an image repository.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
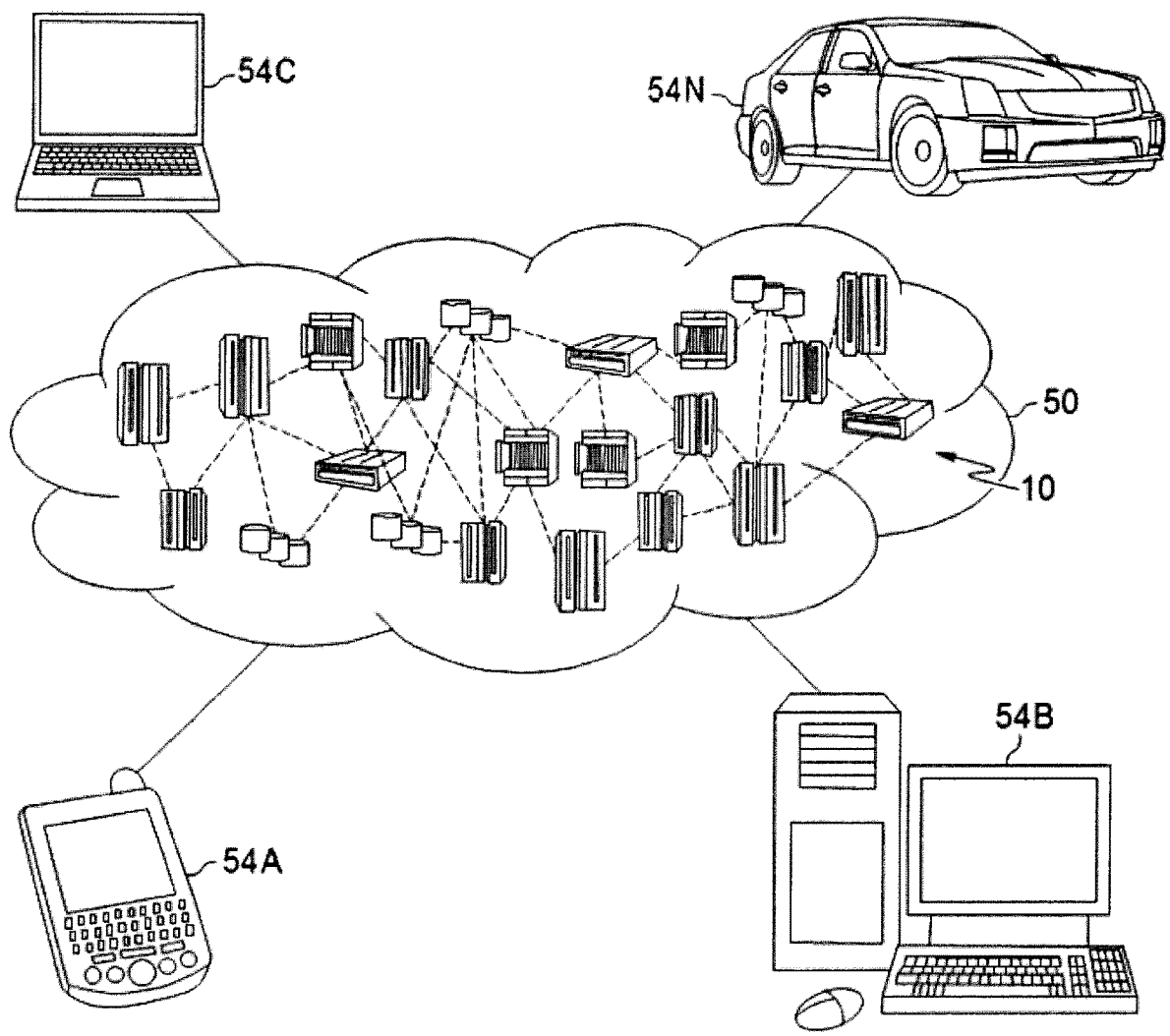
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
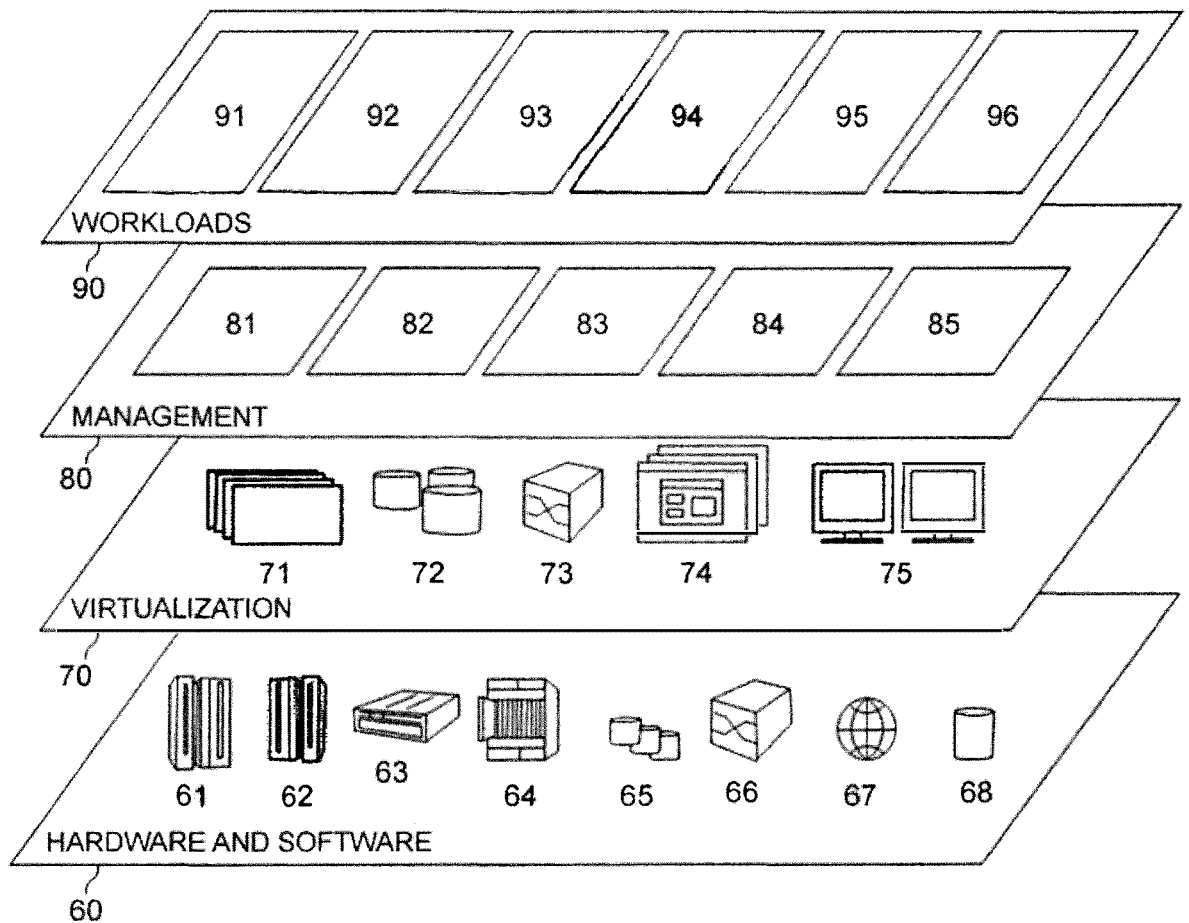
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining one or more settings of a camera apparatus 96 as described herein.

Figure 4A:
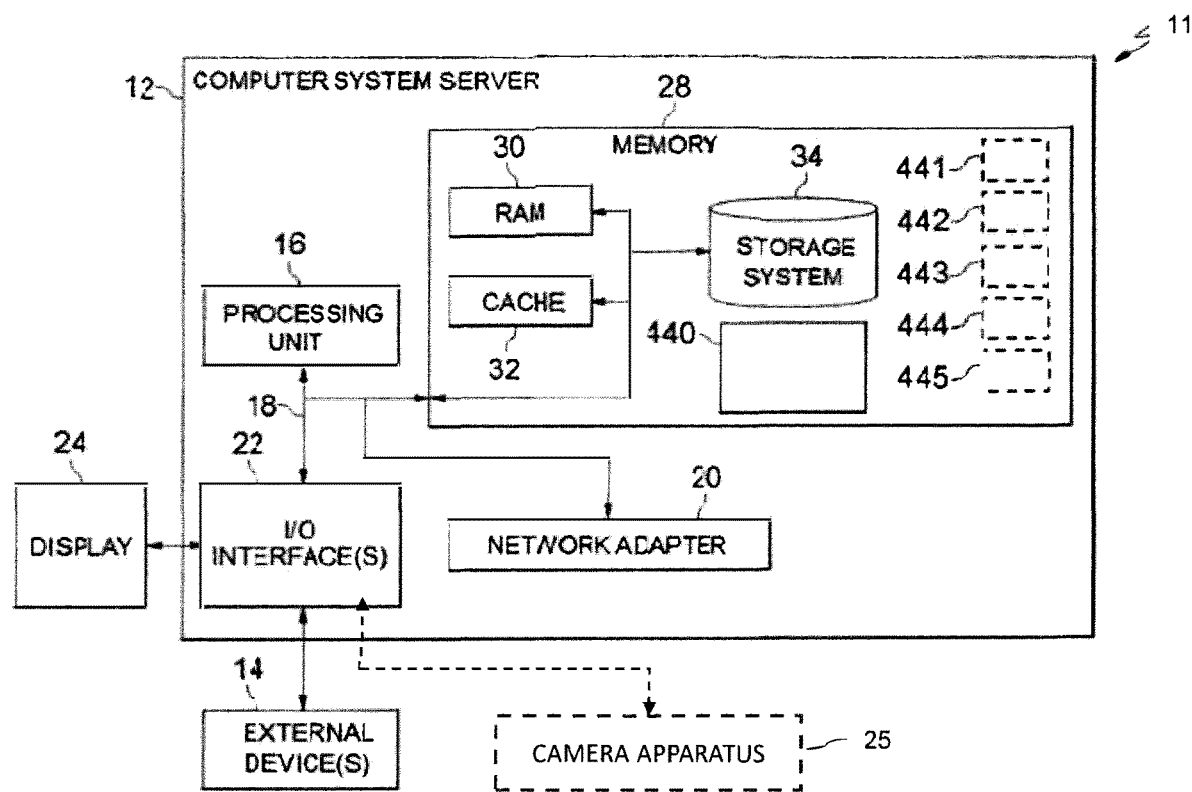
FIGS. 4A-4B depict a hardware overview of a computing node, in accordance with one or more aspects set forth herein.
Figure 4B:
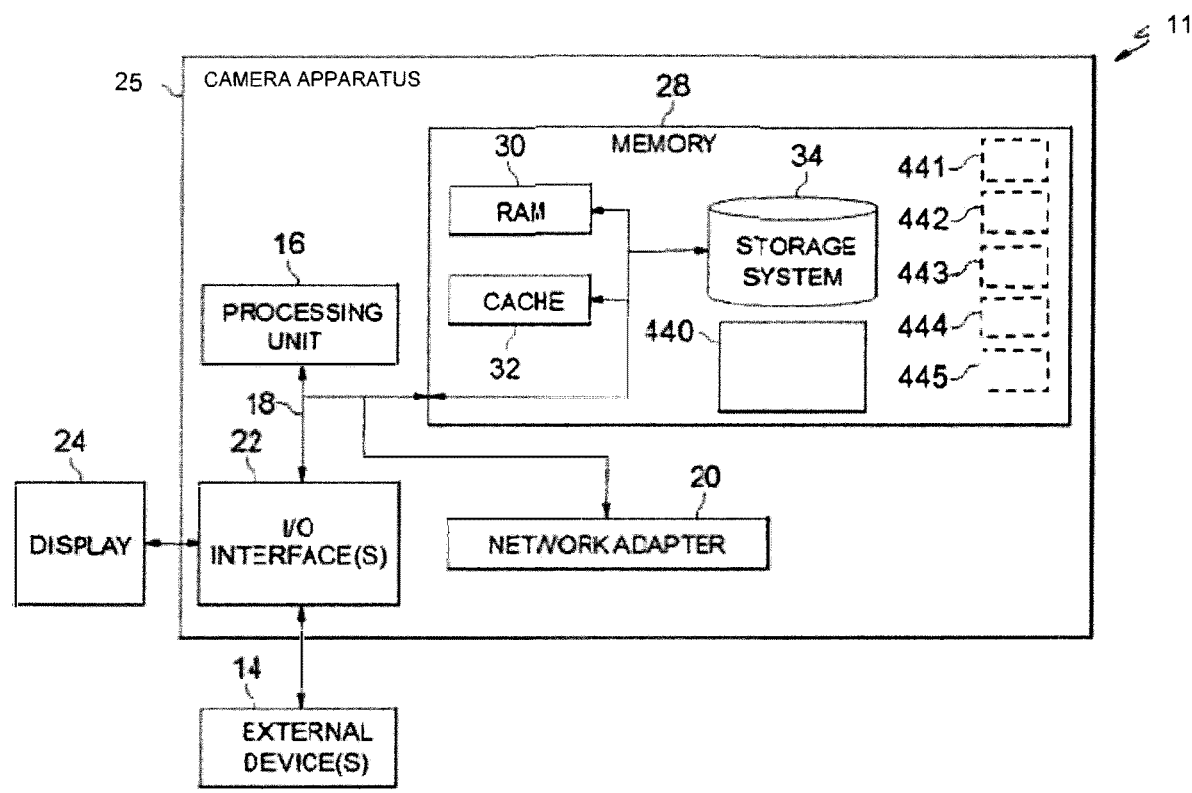

FIG. 4A depicts a hardware overview of a computing node 11, which may be a cloud computing node 10 and/or a computer system, in accordance with one or more aspects set forth herein. FIG. 4B depicts a hardware overview of a computing node 11 which may be a camera apparatus 25, in accordance with one or more aspects set forth herein.

Program/utility 40 as set forth in FIG. 1 can include one or more program 440 as set forth in FIG. 4A and/or FIG. 4B, and program/utility 40 can optionally include some or all of one or more program 441, 442, 443, 444, 445. Additionally, computer system/server 12 in FIG. 4A may communicate with one or more external devices 14, a display 24, and a camera apparatus 25 via Input/Output (I/O) interfaces 22. Additionally, camera apparatus 25 in FIG. 4B may communicate with one or more external devices 14, including a cloud computing node 10 and/or a computer system, and a display via Input/Output (I/O) interfaces 22.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein including determining one or more settings of a camera apparatus 96.

Referring again to FIG. 4A and FIG. 4B:

The present invention may be a system such as a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
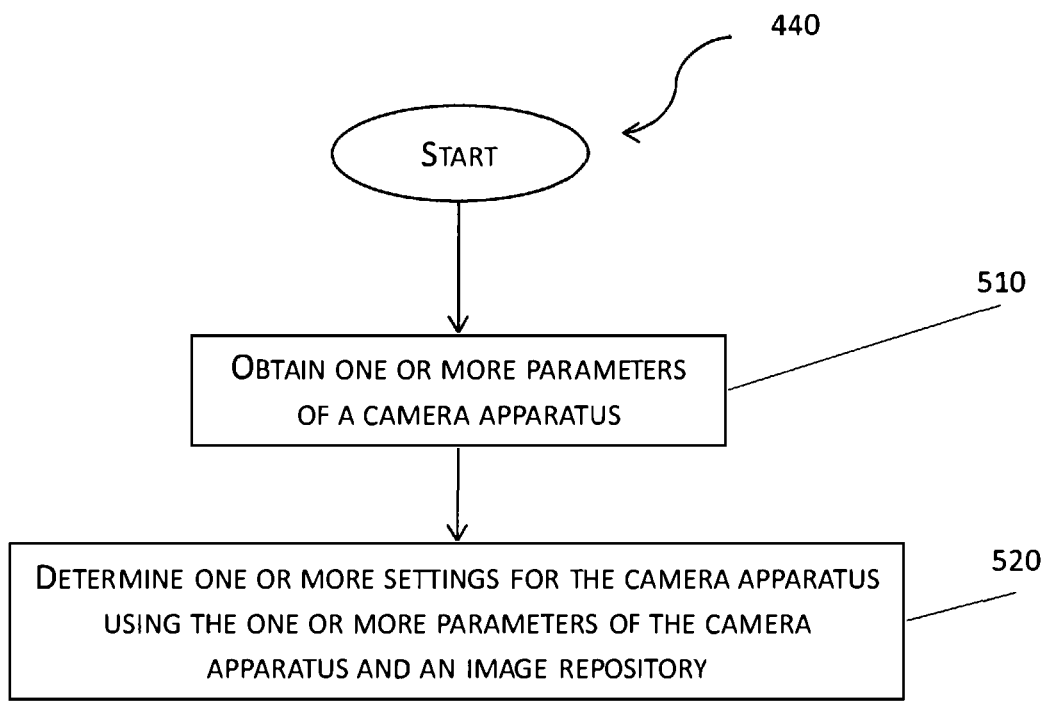
FIG. 5 depicts a workflow, in accordance with one or more aspects set forth herein.

FIG. 5 depicts a workflow, in accordance with one or more aspects set forth herein. By way of example, the processes described with respect to FIG. 5 can be performed using one or more program 440 on one or more computing node 10 or one or more computing node 11 as detailed with respect to FIGS. 1-4B.

In the embodiment of FIG. 5, one or more program 440 at block 510 obtains, at one or more processor 16, one or more parameters of a camera apparatus. One or more program 440 at block 520 determines, at one or more processor 16, one or more settings of the camera using one or more parameters of the camera apparatus and an image repository. The term "camera apparatus" is broadly used herein to connote any apparatus capable of recording and/or creating images, including but not limited to stand-alone cameras as well as camera devices integrated with mobile devices.

Figure 6A:
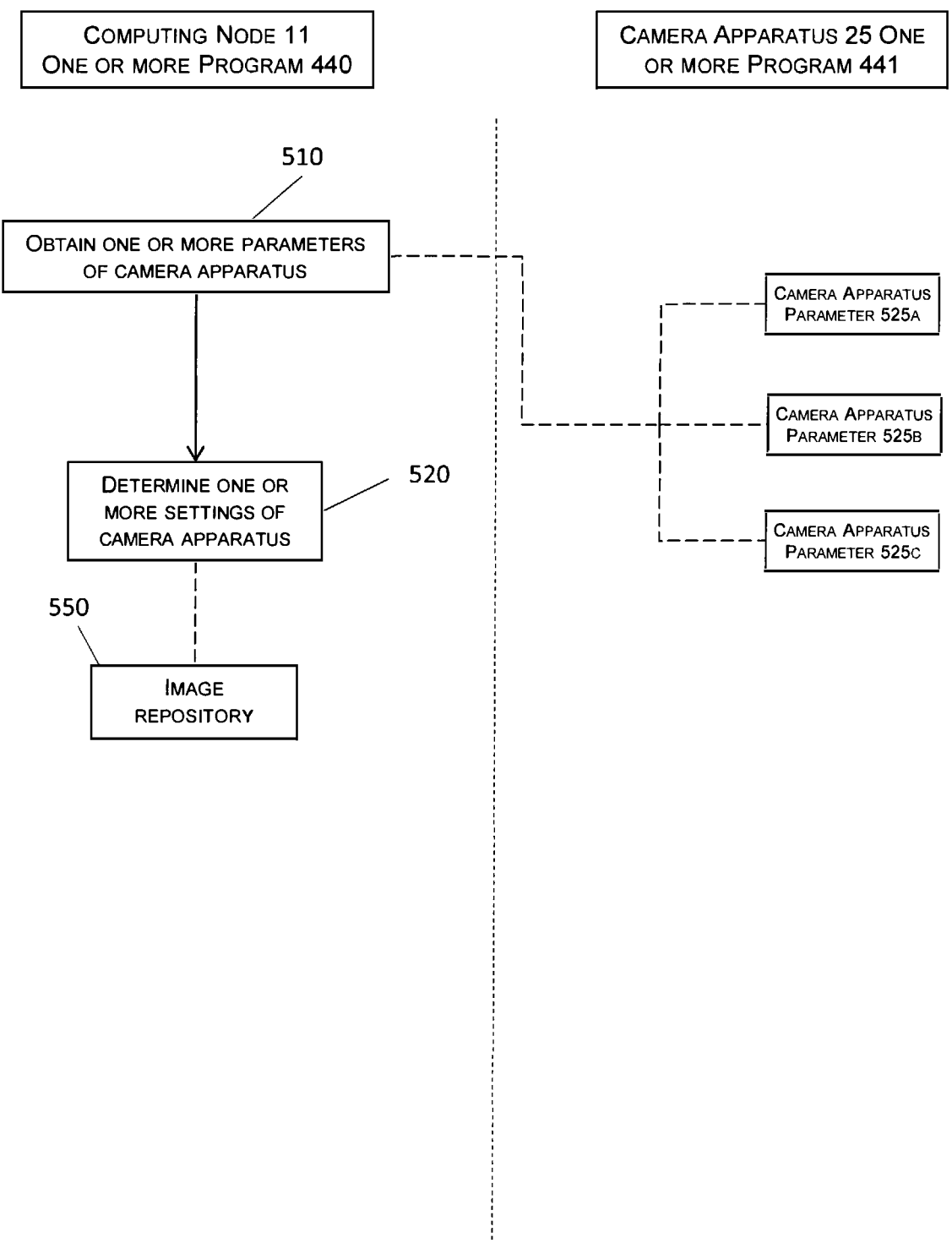
FIGS. 6A-6G depict exemplary embodiments of the process depicted in FIG. 5
Figure 6B:
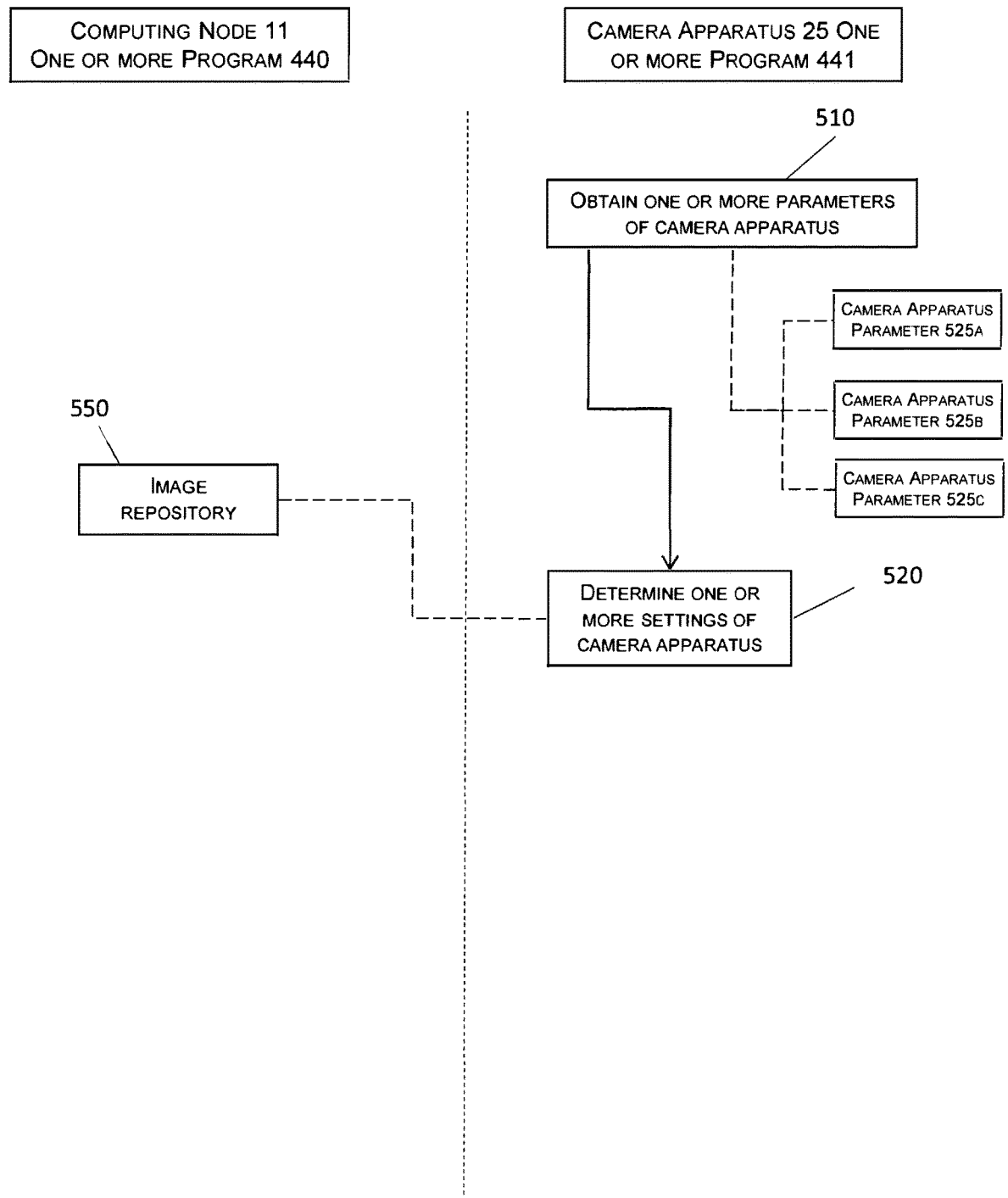

FIGS. 6A-6G depict exemplary embodiments of the process depicted in FIG. 5. By way of explanation, in FIGS. 6A-6G, processes are illustrated from the point of view of a computing node 11 one or more program 440 and a camera apparatus 25 one or more program 441. In one embodiment, one or more program 440 runs on one or more processor of computing node 11 as further illustrated in the examples of FIGS. 1-4. In another embodiment, one or more program 440 runs on one or more processor of a camera apparatus. In other embodiments, various programs can run on a different complement of devices. For example, in one embodiment, one or more program 440 and one or more program 441 can both run on a camera apparatus, a computer system, or other combinations of different devices. FIGS. 6A and 6B illustrate processes as described, in part, in FIG. 5. FIGS. 6C-6G elaborate on FIGS. 6A and 6B, providing additional detailed embodiments of one or more programs 440 and/or 441. It may be understood that the detailed embodiments are not limiting, and additional embodiments may include combinations of any one or more of embodiments illustrated by FIGS. 6A-6G, as well as additional alternative embodiments. It may also be understood that for simplicity and clarity only, FIGS. 6C-6G are based on the embodiment depicted in FIG. 6B and that each of the detailed embodiments depicted in FIGS. 6C-6G may be applied to the embodiment of FIG. 6A without loss of generality and without limitation.

FIG. 6A illustrates one embodiment of a process including a computing node 11 one or more program 440 and a camera apparatus 25 one or more program 441. One or more program 440 running on computing node 11 at block 510 obtains, at one or more processor 16, one or more parameters 525a, 525b, 525c of camera apparatus 25. One or more program 440, at block 520, determines one or more settings of the camera apparatus 25 using the one or more parameters 525a, 525b, 525c and image repository 550. Image repository 550 may be a part of computing node 11 one or more program 440. In one example, image repository 550 may include image repositories on multiple computing nodes 11 running one or more program 440. Using one or more parameters 525a, 525b, 525c of the camera apparatus 25 may, in one example, include camera apparatus one or more program 441 sending the one or more parameters of the camera apparatus to computing node 11 one or more program 440. In one example, image repository 550 may be provided as a service in a cloud environment, as detailed with respect to FIGS. 1-4. FIG. 6A depicts one exemplary embodiment in which image repository 550 is external from the camera apparatus. In alternative embodiments, image repository 550 may in part or entirely be included in camera apparatus one or more program 441.

FIG. 6B illustrates another embodiment of a process including a computing node 11 one or more program 440 and a camera apparatus 25 one or more program 441. One or more program 440 running on computing node 11 at block 510 obtains, at one or more processor 16, one or more parameters 525a, 525b, 525c of camera apparatus 25. One or more program 440, at block 520, determines one or more settings of the camera apparatus 25 using the one or more parameters 525a, 525b, 525c and image repository 550. Using image repository 550 may include one or more program 441 sending a search request to computing node 11 one or more program 440, and one or more program 440 may search image repository 550 on computing node 11 and/or may search image repositories on multiple computing nodes 11 running one or more program 440. In one example, image repository 550 may be a part of computing node 11 one or more program 440. In another example, image repository 550 may reside on a separate computing node. In another example, image repository 550 may include multiple image repositories computing node 11 or residing on multiple computing nodes 11 running one or more program 440. In another example, image repository 550 may be provided as a service in a cloud environment, as detailed with respect to FIGS. 1-4. FIG. 6B depicts one exemplary embodiment in which image repository 550 is external from the camera apparatus. In alternative embodiments, image repository 550 may in part or entirely be included in camera apparatus one or more program 441.

Figure 6C:
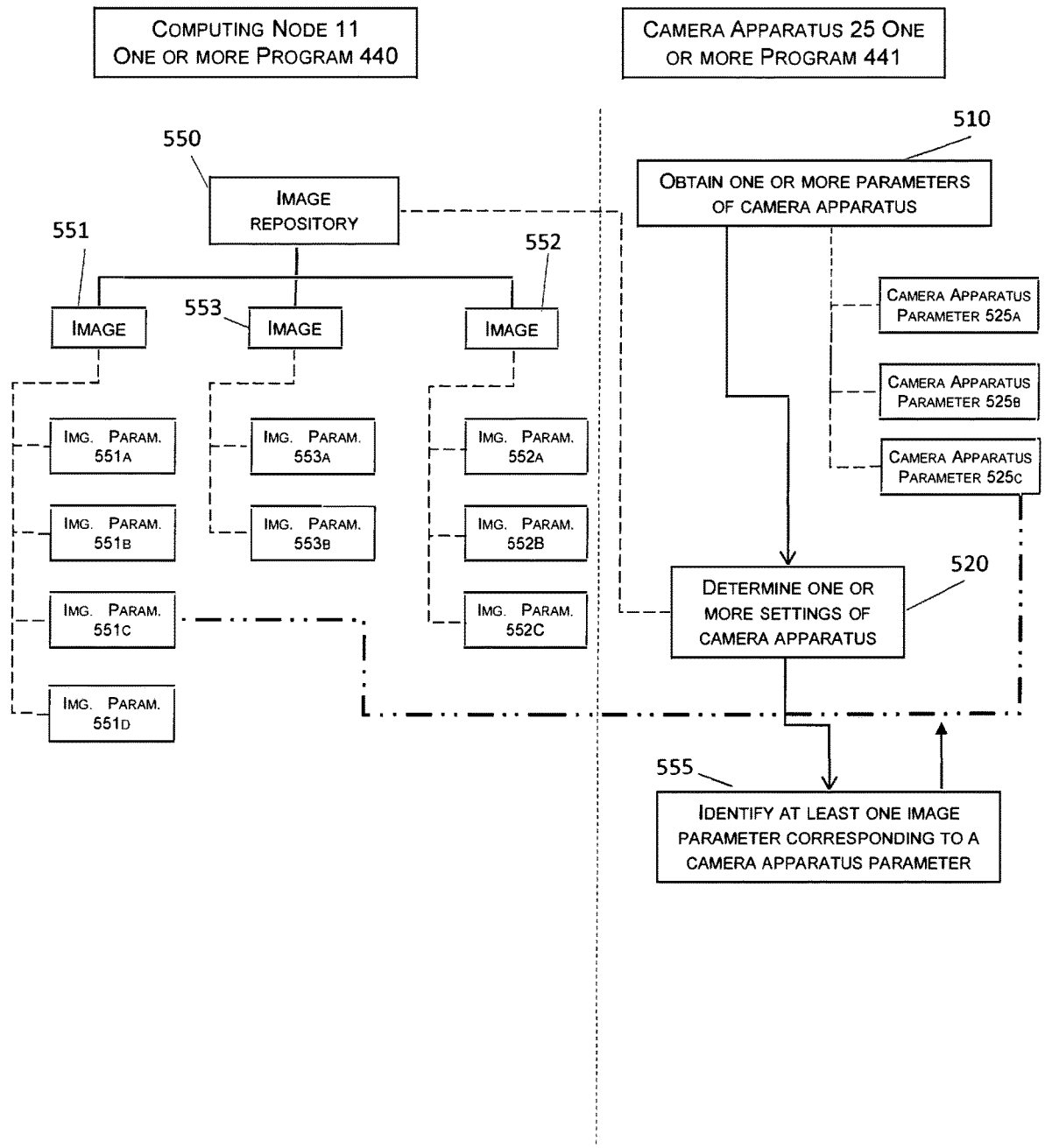

FIG. 6C illustrates one exemplary embodiment of the process of FIG. 6B. Using image repository 550 may include using one or more images 551, 552, 553 of image repository 550. Image 551 may, for example, have one or more image parameters 551a, 551b, 551c, 551d associated with image 551. Similarly, images 552 and 553 may have one or more respective image parameters associated with images 552 and 553. As FIG. 6C illustrates, at block 555, at least one image parameter is identified as corresponding to a parameter of the one or more parameters of the camera apparatus. For example, camera apparatus may include camera apparatus parameters 525a, 525b, 525c, and image parameter 551c may be identified 555 as corresponding to camera apparatus parameter 525c. For instance, camera apparatus parameter 525c may be a shutter speed of the camera apparatus, and image parameter 551c may correspond to the shutter speed of a camera that was used to create image 551. Similarly, in another instance, camera apparatus parameter 525c might correspond to a condition external to the camera apparatus, such as an ambient lighting condition, and image parameter 551c may correspond to the same external condition, such as the ambient lighting condition in which image 551 was created.

As FIG. 6C indicates, one or more images 551, 552, 553 need not have the same image parameters or the same number of image parameters. As well, any two or more images 551, 552 may have similar types of image parameters 551c, 551c, 552c, but specific values for image parameters of one image may not correspond to camera apparatus parameters. For example, image parameters 551c, 552c and camera apparatus parameter 525c may be ambient light condition parameters. Camera apparatus parameter 525c may more specifically be a low lighting condition, such as when a user is using the camera apparatus indoors in dim lighting. Image parameter 551c may be a similar or matching low lighting condition, as image 551 may have been created by a camera that was indoors and in dim lighting, and thus may be identified as corresponding to camera apparatus parameter 525c. Image parameter 552c, on the other hand, may specifically be a bright lighting condition, as image 552 may have been created by a camera that was outdoors in bright sunlight, and thus may not be identified as corresponding to camera apparatus parameter 525c even though both image parameter 552c and camera apparatus parameter 525c are generally "ambient lighting condition" parameters.

Figure 6D:
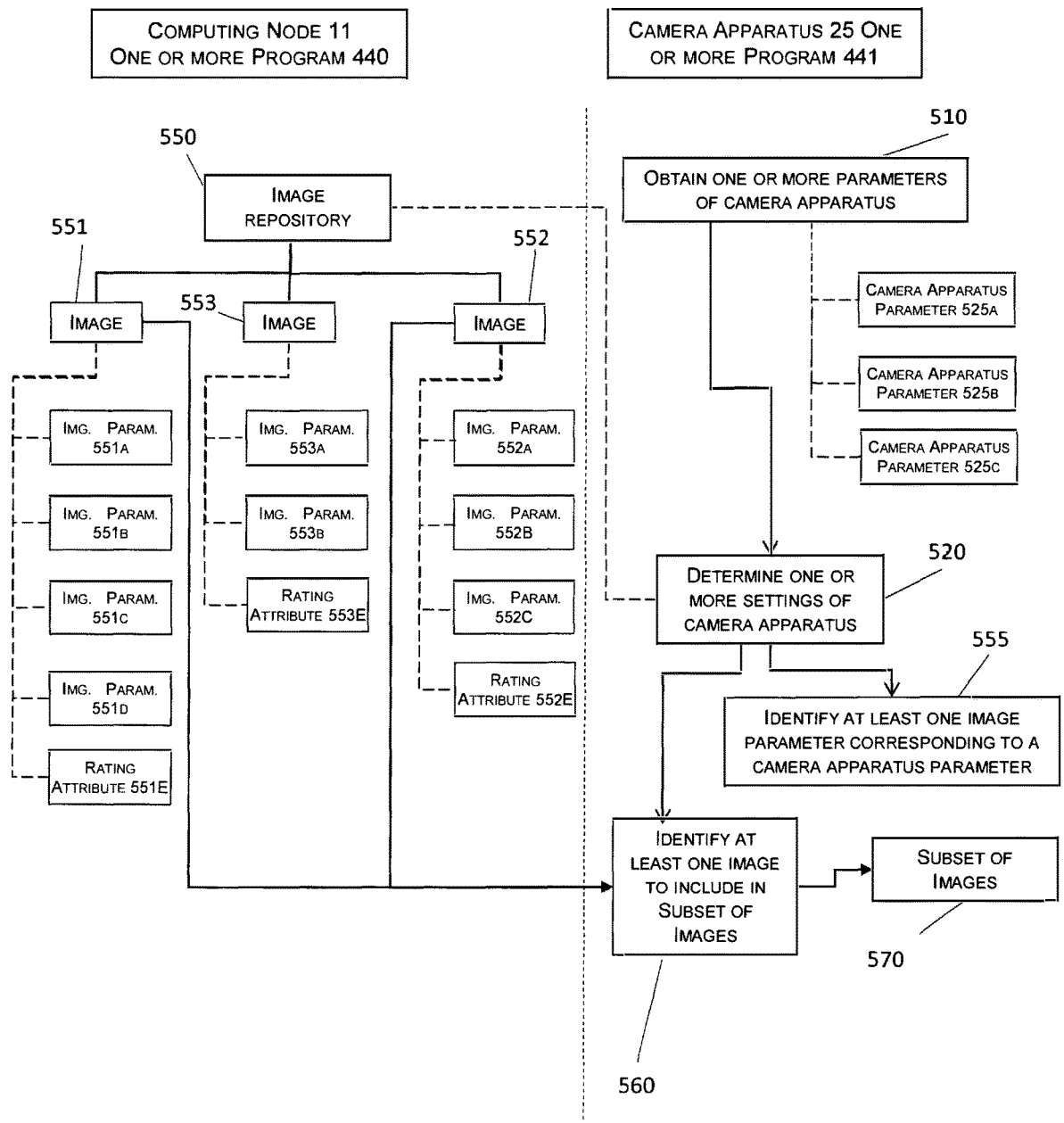

FIG. 6D further details the processes illustrated by FIGS. 6B and 6C. In one embodiment, the one or more images 551, 552, 553 of image repository 550 may have a respective rating attribute 551e, 552e, 553e, as well as one or more image parameters. A rating attribute may correspond, for example, to numerical ratings given to an image by users of image repository 550 and/or to an average or aggregate rating of numerical ratings given to the image by users of image repository 550. For instance, images in image repository 550 may be presented to users via a web-site, a computer program product, as part of a service provided in a cloud environment, or by another means of presenting images. Users may be allowed to, for example, assign a numerical rating to an image, approve or disapprove an image, and so on. Users may assign high ratings to images for any reason or several reasons, such as pleasing aesthetic qualities of an image, interesting subject matter of an image, technical qualities of an image, and so on. Conversely, users may give low ratings to images that, for example, have poor technical qualities, uninteresting subject matter, and so on. As detailed further below, using rating attributes associated with images in image repository 550 may facilitate using images of the image repository 550 to determine one or more settings of a camera apparatus, as an image with a high rating attribute may be very likely to be a high-quality image created with appropriate or optimal camera settings.

As illustrated in FIG. 6D, the process may include, at block 560, identifying at least one image of the one or more images to be included in a subset of images 570, wherein the identifying is based on the rating attribute of the at least one image and on at least one image parameter of the at least one image. In the example specifically depicted in FIG. 6D, images 551 and 552 are identified 560 to be included in subset of images 570, based on at least one image parameter of image 551 and at least one image parameter of image 552 and the respective rating attributes 551e, 552e, as further illustrated and detailed in FIG. 6E. Identifying 560 at least one image to be included in subset of images 570 may further include using the one or more parameters of the camera apparatus 25, as correlations between image parameters and camera apparatus parameters may be used to identify which images 551, 552 of image repository 550 are to be included in subset of images 570 and which images, such as image 553, should not be included in subset of images 570, as also further illustrated in FIG. 6E.

Figure 6E:
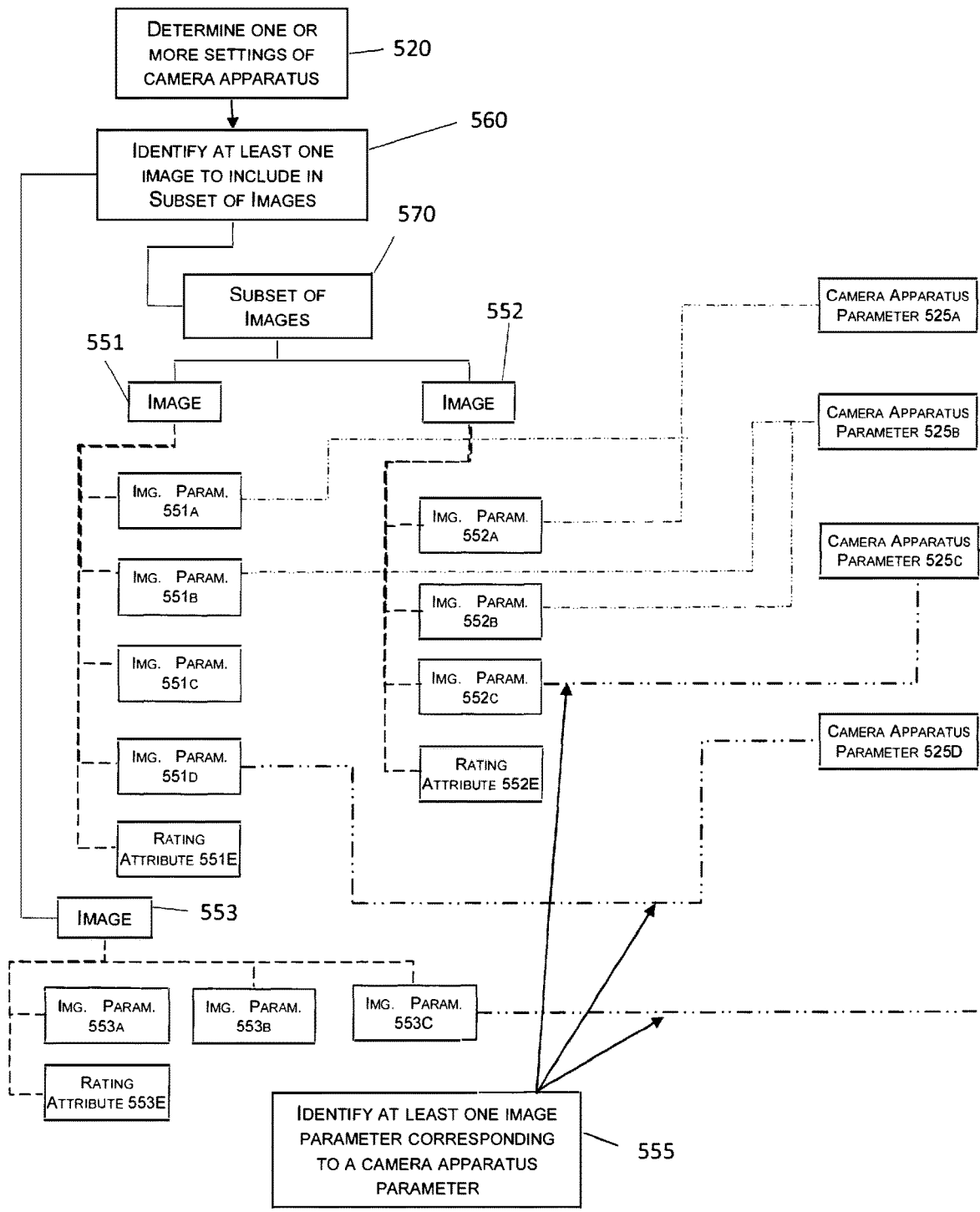

FIG. 6E depicts a portion of FIG. 6D in detail to further illustrate identifying 560 at least one image to include in subset of images 570. For example, identifying 560 the at least one image 551 to be included in the subset of images 570 may involve identifying 555 an image 551 that has more image parameters 551a, 551b, 551d that correspond to parameters 525a, 525b, 525d of the one or more parameters of the camera apparatus 25 than images of the one or more images, such as image 553, not identified to be included in the subset of images 570. As the example of FIG. 6E illustrates, identifying 560 at least one image may include identifying additional images, such as image 552, to be included in subset of images 570. As further illustrated by FIG. 6E, image parameters 551a, 551b, 551d of image 551 are identified as corresponding to parameters 525a, 525b, 525d of the one or more camera apparatus parameters, while image parameters 552a, 552b, 552c of image 552 are identified as corresponding to parameters 525a, 525b, 525c of the one or more camera apparatus parameters. Thus, images 551, 552 included in subset of images 570 need not share identical image parameters that correlate to the one or more parameters of the camera apparatus. For instance, images 551 and 552 of subset of images 570 may share similar image parameters 551a, 552a such as a model of camera used to create images 551 and 552, which may correspond to, by way of example, a camera model parameter 525a of the camera apparatus. On the other hand, image 551 may have, by way of example, a lighting condition parameter 551c corresponding to bright lighting and image 552 may have a lighting condition parameter 552c corresponding to dim lighting; if camera apparatus has a camera apparatus parameter 525c corresponding to dim lighting, then image parameter 552c may correlate to camera apparatus parameter 525c while image parameter 551c may not. Similarly, by way of example, image 551 may have an image parameter 551d that corresponds to a camera apparatus parameter 525d, but image 552 may lack a similar image parameter. For instance, image 552 may not have any information regarding weather conditions associated with image 552.

The examples of correlation between image parameters and camera apparatus parameters illustrated by FIG. 6E and described above are by way of illustration and example only, and it should be apparent that images included in subset of images 570 may have many more correlations between associated image parameters and camera apparatus parameters, or may have fewer such correlations. Generally, at least one image 551 included in subset of images 570 will have at least one image parameter, such as image parameter 551a, that correlates with at least one parameter 525a of the one or more camera apparatus parameters. It is possible, in some embodiments, for no images of image repository 550 to be identified to be included in subset of images 570, as it is possible that no image in image repository 550 has any image parameters that correspond to any parameters of the one or more camera apparatus parameters. In this case, one or more program 440 and/or one or more program 441 may revert determination of the one or more settings of the camera apparatus to the camera apparatus and/or the user of the camera apparatus.

As further illustrated in FIG. 6E, at least one image 551 identified 560 to be included in subset of images 570 may have a higher rating attribute 551e than images of the one or more images, such as image 553, not identified to be included in the subset of images. A rating attribute may correspond, for example, to numerical ratings given to an image 551, 552, 553 by users of image repository 550 and/or to an average or aggregate rating of numerical ratings given to the image by users of image repository 550. The rating attribute 551e of an image 551 in image repository 550 may be significant in identifying 560 the image to be included in subset of images 570 or to not be included in subset of images 570, as it may generally be desirable to include images with high rating attributes in the subset of images 570 and to not include images with low rating attributes. Although rating attributes may be assigned by users of image repository 550 for subjective or even arbitrary reasons, users may generally assign a high rating attribute to an image if it is, for example, aesthetically pleasing and/or visually appealing, or if it exemplifies certain technical qualities, for instance. Images with a high rating attribute, for example a high average rating of numerous individual ratings, are likely to be images created with the most appropriate camera apparatus settings, such as close-up images created with an appropriate lens type and correct focal length, images of subjects in motion created with the most appropriate shutter speed, images created indoors with the most appropriate flash settings, and so on. Images with a low rating attribute, on the other hand, are likely to be images created with one or more incorrect or inappropriate camera apparatus settings. For example, an image may receive a low average rating if the image was created in dim lighting without use of a flash, or if, in another example, the image is of a subject in motion taken at too low of a shutter speed, resulting in a blurry image. Taking a rating attribute 551e of an image 551 into account when identifying 560 at least one image may help ensure that images selected to be included in the subset of images 570 may be the best or most appropriate images for determining the one or more settings of the camera apparatus, as described further below.

As shown in FIG. 6E, an image 553 of image repository 550 may not be identified for inclusion in subset of images 570. Image 553, for example, may have a relatively low rating attribute 553e, so that even if image 553 has several image attributes 553a-553c that correlate to the one or more camera apparatus parameters 525a-525c, the image will not be identified for inclusion in the subset of images. As well, or alternatively, image 553 may have few or no image parameters 553a, 553b that can be identified 555 as corresponding with any of the one or more parameters of the camera apparatus. As depicted in the example of FIG. 6E, image 553 may have one or more image parameters 553c that correspond to a parameter 525c of the one or more camera apparatus parameters; however, the identifying 560 by one or more program 440 and/or one or more program 441 may determine that the correlation between image parameter 553c and camera apparatus parameter 525c is not sufficient to include image 553 in subset of images 570. Thus, it is possible that an image 553 of image repository 550 may have a higher rating attribute 553e than another image 551 of image repository 550, but image 553 may not be included in subset of images 570 if it has few or no image parameters that can be identified as corresponding with the one or more camera apparatus parameters. For example, the image 553 may be very highly rated but may be inappropriate for determining one or more settings of the camera apparatus because image 553 was created, for instance, by a digital single-lens reflex (DSLR) camera with a zoom lens whereas the camera apparatus is a low-resolution camera of a mobile device without a zoom lens. In an alternative embodiment, even one correlation between an image parameter 553c and camera apparatus parameter 525c may allow for inclusion in subset of images 570.

In one example embodiment, the identifying 560 may include a pre-selected minimum number of image parameters that any image of image repository 550 must have that correlate with the one or more camera apparatus parameters in order for the image to be included in the subset of images. In another example, the identifying 560 may "on the fly" determine how many image parameters of an image should correlate to the one or more camera apparatus parameters in order for the image to be included in the subset of images 570. This may, for example, allow one or more program 440 and/or one or more program 441 a great deal of flexibility in the identifying 560 of images, as in some cases image repository 550 may only have images that have just a few or even only one image parameter that correlate to camera apparatus parameters, and in other cases image repository 550 may have several images with few correlations between the image parameters and camera apparatus parameters as well as several images with a high number of correlations between the image parameters and camera apparatus parameters.

In yet another alternative embodiment, some image parameters may be weighted more highly than other image parameters, so that images 551, 552 included in the subset of parameters may have image parameters that correlate to more significant camera apparatus parameters. For example, it may be more important to identify images of image repository 550 that were created with a particular type of lens, such as a wide-angle lens or zoom lens, than it is to identify images of image repository 550 that were created with the same model or brand of camera. In this example, an image parameter for "lens type" may be weighted more heavily, such as by a numerical weight value, than an image parameter for "camera model," so that an image is more likely to be identified 560 for inclusion in the subset of images 570 if the image has a "lens type" image parameter that correlates to a "lens type" parameter of the camera apparatus, even if the image does not have a "camera model" parameter that correlates to the "camera model" parameter of the camera apparatus. Similarly, an image in image repository 550 that has a "lens type" image parameter that does not correlate to the "lens type" parameter of the camera apparatus may be less likely to be included in subset of images 570, even if the image has a "camera model" parameter that correlates exactly to the "camera model" parameter of the camera apparatus.

It may be understood that the several variant embodiments described above are not exhaustive, and it may be further understood that other parameters or conditions may also or alternatively be used in identifying 560 one or more images of an image repository 550 to be included in the subset of images 570.

Figure 6F:
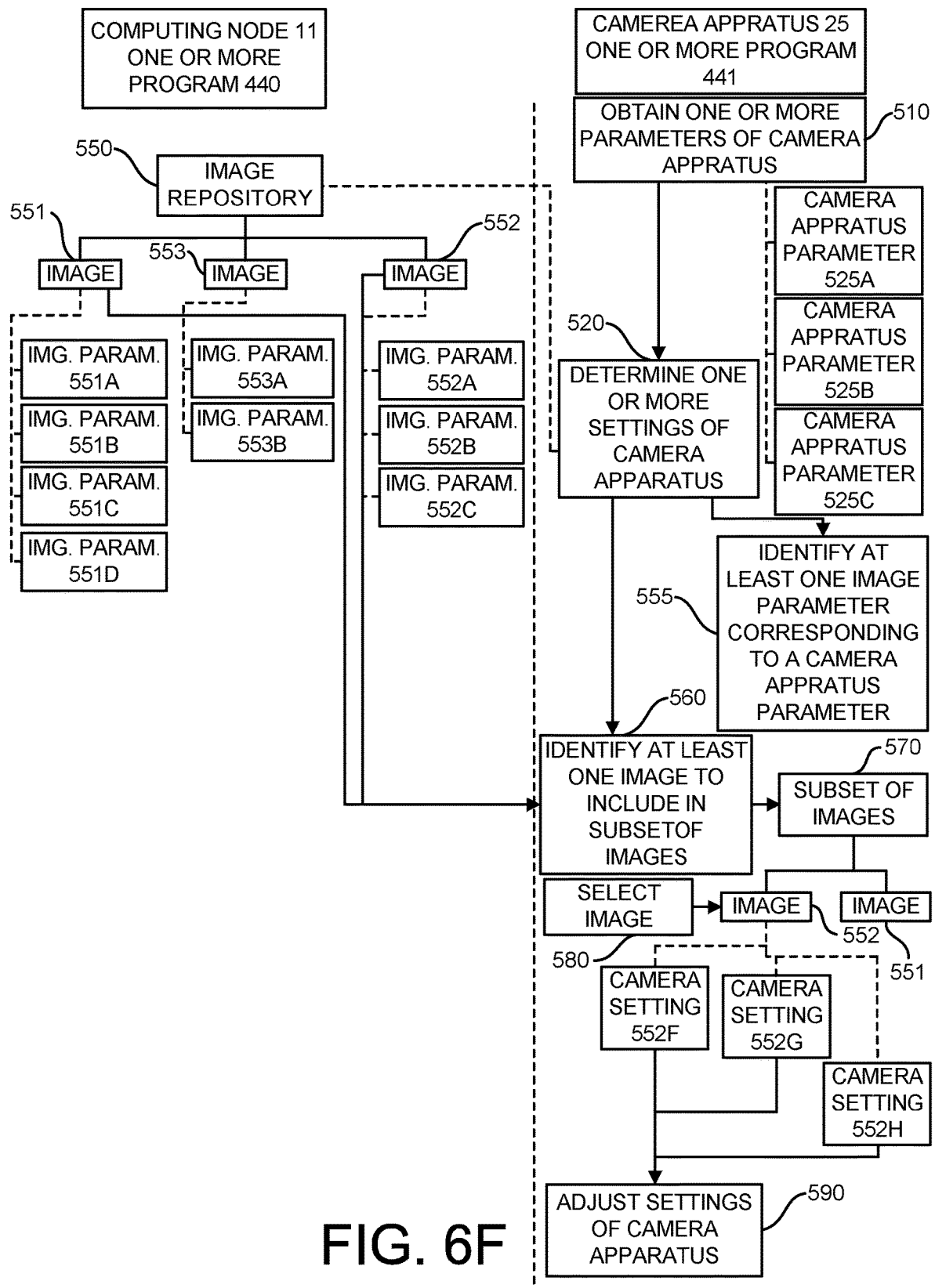

FIG. 6F further depicts the process of FIGS. 6B-6E, in which the one or more images of image repository 550 have one or more camera settings associated with the one or more images, such as the camera settings 552f, 552g, 552h associated with image 552. The camera settings 552f, 552g, 552h of an image 552 may correspond to camera settings that were used to create the image 552. Determining the one or more settings for the camera apparatus may further include, at block 580 of one or more program 440, selecting one image 552 of subset of images 570. The one image 552 may have a higher rating attribute than the rating attributes of other images 551 in the subset of images 570. It may be understood that block 580 is depicted in FIG. 6F as being carried out by one or more program 441 for simplicity, and that block 580 may alternatively be carried out by one or more program 440 running on computing node 11, or may be carried out in part by one or more program 440 and in part by one or more program 441.

Determining the one or more settings for the camera apparatus may also include, at block 590, automatically adjusting the one or more settings for the camera apparatus 25 based on the one or more camera settings 552f, 552g, 552h associated with the one image 552. As depicted in the example of FIG. 6F, block 590 may be carried out at camera apparatus 25 one or more program 441. It may be understood that in other example embodiments, block 590 may be carried out in part by one or more program 441 running on the camera apparatus 25 and in part by one or more program 440 running on computing node 11. For example, one or more program 440 may send camera settings 552f, 552g, 552h of selected image 552 to the camera apparatus one or more program 441, and one or more program 441 may use camera settings 552f, 552g, 552h to automatically adjust similar or corresponding settings of the camera apparatus. For instance, camera settings 552f, 552g, 552h may be respectively a focal length setting, a flash setting, and a shutter speed setting, that were used to create image 552. At block 590, one or more program 441 and/or one or more program 440 may automatically adjust the focal length setting, flash setting, and shutter speed setting of the camera apparatus. It may be understood that camera settings 552f, 552g, 552h are depicted in FIG. 6F by way of example only, and that an image selected at block 580 may have more or fewer camera settings, and/or different camera settings, associated with the selected image.

Figure 6G:
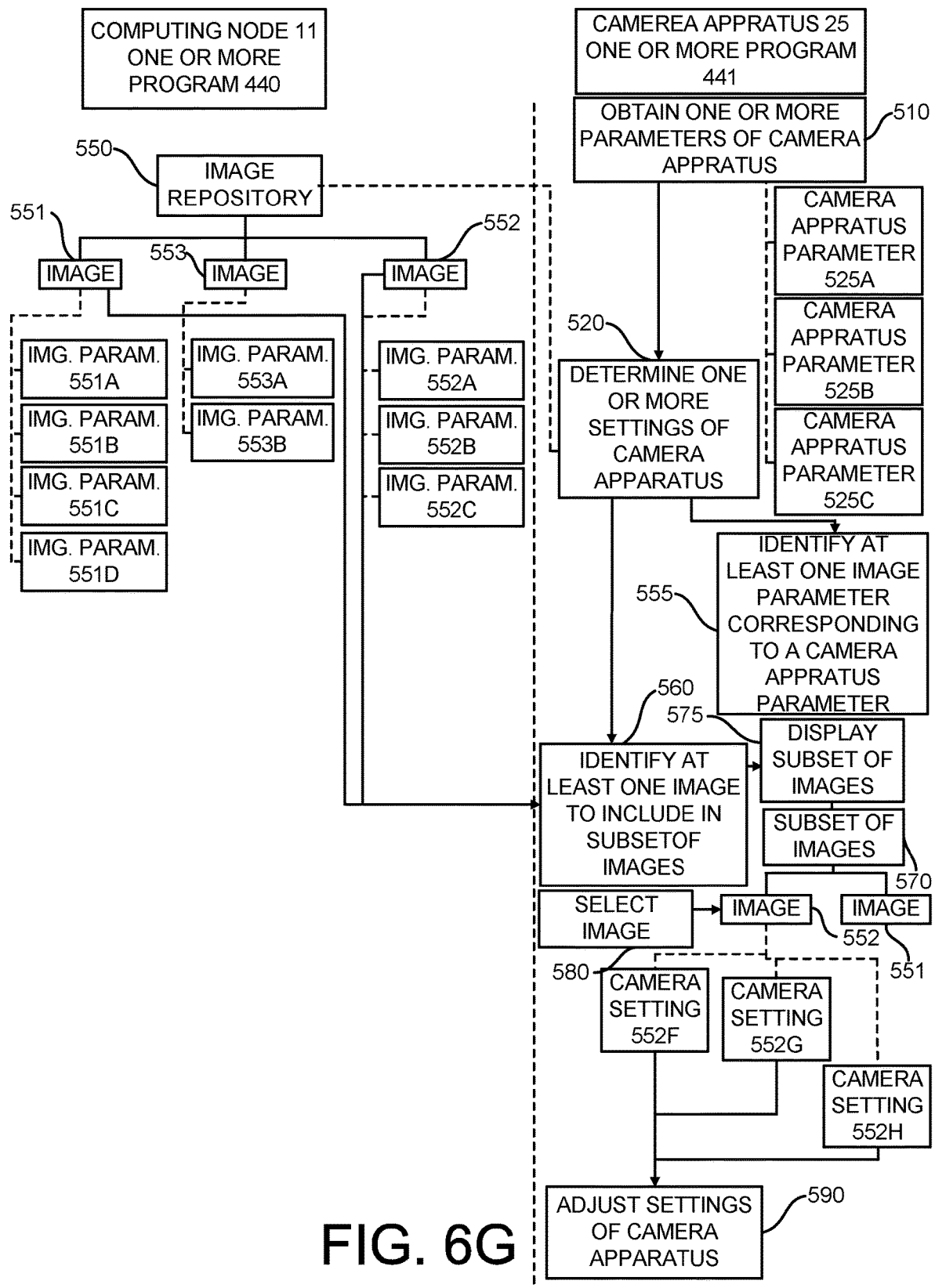

FIG. 6G further depicts the process of FIGS. 6B-6E in an alternative embodiment, in which subset of images 570, at block 575, are displayed at the camera apparatus 25. At block 580, one image 551 of the subset of images 570 is selected. In exemplary embodiments, selecting 580 an image 551 may be performed by a user of the camera apparatus 25, based on the display of the subset of images 575. For example, one or more program 441 may obtain subset of images 570 and display 575 the images, for example, on a display screen or in a user interface that may allow the user to select one image of the subset of images 570. In such an example, the user may be able to view the images included in the subset of images 570, and may be able to select, via a user interface, one image 551 of the subset of images 570. The camera settings 551f, 551g, 551h associated with the image 551 selected by the user may then be used to automatically adjust, at block 590, the one or more settings of the camera apparatus.

In any one or more of the embodiments of FIGS. 5 and 6A-6G, or in alternative embodiments, the one or more settings of the camera apparatus may include, but are not limited to, one or more of a focal length, a shutter speed, an exposure time, a color balance, a flash setting, a light sensitivity setting, or an aperture size. In any one or more of the embodiments of FIGS. 5 and 6A-6G, or in alternative embodiments, the one or more parameters of the camera apparatus may include, but are not limited to, one or more of a camera brand, a camera model, an image resolution, a pixel size, a geographical location, a lighting condition, a weather condition, a date parameter, a time parameter, a camera orientation parameter, a focal length, a shutter speed, an exposure time, a color balance, a flash setting, a light sensitivity setting, or an aperture size.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed. It will be further understood that the term "based on" is intended to include both "based on in part" and "based on entirely" or "entirely based on."

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining, at one or more processors, one or more parameters of a camera apparatus; and
   determining, at one or more processors, one or more settings for the camera apparatus using the one or more parameters of the camera apparatus and an image repository, wherein using the image repository comprises using one or more images of the image repository, the one or more images having one or more image parameters associated with the one or more images, and wherein the determining further comprises using at least one image parameter and at least one parameter of the one or more parameters of the camera apparatus.

2. The method of claim 1, wherein the image repository is external from the camera apparatus.

3. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image.

4. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, and wherein the at least one image identified to be included in the subset of images has more image parameters identified as corresponding to parameters of the one or more parameters of the camera apparatus than images of the one or more images not identified to be included in the subset of images.

5. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, wherein the at least one image identified to be included in the subset of images has a higher rating attribute than images of the one or more images not identified to be included in the subset of images.

6. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, and wherein the one or more images have one or more camera settings associated with the one or more images, and wherein determining the one or more settings for the camera apparatus further comprises selecting one image of the subset of images, and automatically adjusting the one or more settings for the camera apparatus based on the one or more camera settings associated with the one image.

7. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, and wherein the one or more images have one or more camera settings associated with the one or more images, and wherein determining the one or more settings for the camera apparatus further comprises selecting one image of the subset of images, and automatically adjusting the one or more settings for the camera apparatus based on the one or more camera settings associated with the one image, wherein the one image has a higher rating attribute than rating attributes of other images included in the subset of images.

8. The method of claim 1, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, and wherein the one or more images have one or more camera settings associated with the one or more images, and wherein determining the one or more settings for the camera apparatus further comprises selecting one image of the subset of images, and automatically adjusting the one or more settings for the camera apparatus based on the one or more camera settings associated with the one image, further comprising displaying the subset of images at the camera apparatus, and wherein selecting one image of the subset of images is performed by a user of the camera apparatus based on the display of the subset of images.

9. The method of claim 1, wherein the one or more settings of the camera apparatus comprise one or more of the following selected from the group consisting of: a focal length, a shutter speed, an exposure time, a color balance, a flash setting, a light sensitivity setting, or an aperture size.

10. The method of claim 1, wherein the one or more parameters of the camera apparatus comprise one or more of the following selected from the group consisting of: a camera brand, a camera model, an image resolution, a pixel size, a geographical location, a lighting condition, a weather condition, a date parameter, a time parameter, a camera orientation parameter, a focal length, a shutter speed, an exposure time, a color balance, a flash setting, a light sensitivity setting, or an aperture size.

11. The method of claim 1, wherein the image repository is provided as a service in a cloud environment.

12. A computer program product comprising:
a computer readable storage medium readable by one or more processing circuits and storing instructions for execution by one or more processors for performing a method comprising:
obtaining one or more parameters of a camera apparatus; and
determining one or more settings for the camera apparatus using the one or more parameters of the camera apparatus and an image repository, wherein using the image repository comprises using one or more images of the image repository, the one or more images having one or more image parameters associated with the one or more images, and wherein the determining further comprises using at least one image parameter and at least one parameter of the one or more parameters of the camera apparatus.

13. The computer program product of claim 12, wherein the one or more images have a user rating attribute provided by at least one user of the image repository, and wherein using the one or more images further comprises identifying at least one image of the one or more images to be included in a subset of images, wherein the identifying is based on the user rating attribute of the at least one image and on at least one image parameter of the at least one image.

14. The computer program product of claim 12, wherein the one or more images have a rating attribute, and wherein using the one or more images further comprises identifying at least one image of the one or more images to be included in a subset of images, wherein the identifying is based on the rating attribute of the at least one image and on at least one image parameter of the at least one image, and wherein the at least one image identified to be included in the subset of images has more image parameters identified as corresponding to parameters of the one or more parameters of the camera apparatus than images of the one or more images not identified to be included in the subset of images.

15. The computer program product of claim 12, wherein the one or more image has a user rating attribute provided by at least one user of the image repository, and wherein using the one or more images further comprises identifying at least one image of the one or more images to be included in a subset of images, wherein the identifying is based on the user rating attribute of the at least one image and on at least one image parameter of the at least one image, and wherein the one or more images have one or more camera settings associated with the one or more images, and wherein determining the one or more settings for the camera apparatus further comprises selecting one image of the subset of images, and automatically adjusting the one or more settings for the camera apparatus based on the one or more camera settings associated with the one image, further comprising displaying the subset of images at the camera apparatus, and wherein selecting one image of the subset of images is performed by a user of the camera apparatus based on the display of the subset of images.

16. The computer program product of claim 12, wherein the one or more settings of the camera apparatus comprise each of a focal length, a shutter speed, an exposure time, a color balance, a flash setting, a light sensitivity setting, or an aperture size.

17. The computer program product of claim 12, wherein the one or more parameters of the camera apparatus comprise each of a camera brand, a camera model, an image resolution, a pixel size, a geographical location, a lighting condition, a weather condition, a date parameter, a time parameter, a camera orientation parameter, a focal length, a shutter speed, an exposure time, a color balance, a flash setting, a light sensitivity setting, or an aperture size.

18. The computer program product of claim 12, wherein the one or more image has a user rating attribute provided by at least one user of the image repository, and wherein using the one or more images further comprises identifying at least one image of the one or more images to be included in a subset of images, wherein the identifying is based on the user rating attribute of the at least one image and on at least one image parameter of the at least one image, and wherein the one or more images have one or more camera settings associated with the one or more images, and wherein determining the one or more settings for the camera apparatus further comprises selecting one image of the subset of images, and automatically adjusting the one or more settings for the camera apparatus based on the one or more camera settings associated with the one image, further comprising displaying the subset of images at the camera apparatus, and wherein selecting one image of the subset of images is performed by a user of the camera apparatus based on the display of the subset of images, wherein the one or more settings of the camera apparatus comprise each of a focal length, a shutter speed, an exposure time, a color balance, a flash setting, a light sensitivity setting, or an aperture size, wherein the one or more parameters of the camera apparatus comprise each of a camera brand, a camera model, an image resolution, a pixel size, a geographical location, a lighting condition, a weather condition, a date parameter, a time parameter, a camera orientation parameter, a focal length, a shutter speed, an exposure time, a color balance, a flash setting, a light sensitivity setting, or an aperture size.

19. A system comprising:
   a memory;
   one or more processors in communication with the memory;
   program instructions executable by the one or more processors via the memory to perform a method comprising:
      obtaining one or more parameters of a camera apparatus; and
   determining one or more settings for the camera apparatus using the one or more parameters of the camera apparatus and one or more images of an image repository, the one or more images having one or more image parameters associated with the one or more images,
   wherein the one or more images have respective user rating attributes provided by one or more users of the image repository, wherein the using the one or more images of the image repository comprises identifying at least one image of the one or more images to be included in a subset of images, and wherein the identifying is based on the user rating attribute of the at least one image.

20. The system of claim 19, wherein the identifying is based on the user rating attribute of the at least one image and on at least one image parameter of the at least one image.

* * * * *